US005354601A

United States Patent [19]

Kamijo et al.

[11] Patent Number: 5,354,601

[45] Date of Patent: Oct. 11, 1994

[54] RECORDING SHEET

[75] Inventors: Hideo Kamijo, Okegawa; Kazuo Sato; Tsutomu Komine, both of Tokyo, all of Japan

[73] Assignees: Kokusai Chart Corporation; Nisshinbo Industries, Inc.

[21] Appl. No.: 980,220

[22] Filed: Nov. 23, 1992

[30] Foreign Application Priority Data

Dec. 3, 1991 [JP] Japan .............................. 3-107256[U]
Jan. 13, 1992 [JP] Japan .............................. 4-004351[U]

[51] Int. Cl.[5] .......................... B32B 27/06; B32B 3/26

[52] U.S. Cl. .................................... 428/216; 428/336; 428/339; 428/480; 428/483; 428/206; 428/304.4; 428/913; 428/914

[58] Field of Search ............... 428/480, 483, 336, 339, 428/216, 304.4, 206

[56] References Cited

U.S. PATENT DOCUMENTS 2,876,187 3/1959 Wolinski ............................ 204/158
5,115,254 5/1992 Onishi et al. .................... 428/323 X

*Primary Examiner*—P. C. Sluby
*Attorney, Agent, or Firm*—Rogers & Killeen

[57] ABSTRACT

A recording sheet having high resistance to water and no tendency to curl, which makes high-density and high-accuracy recording possible by making use of a water-based pen in a high humidity and/or high temperature environment, or in an environment where temperature changes greatly, the recording sheet being formed in such a way that an ink absorbing layer or a printing layer is provided on at least one side of a substrate formed of a foamable polyester film.

11 Claims, 1 Drawing Sheet

RECORDING SHEET

BACKGROUND OF THE INVENTION

1. Field of the Invention

The present invention relates to a recording sheet which records by contact printing using water-based ink. More particularly, the present invention relates to a recording sheet for operating with a high degree of accuracy while, for example, recording heat treatment temperatures, recording, in high densities, phenomena which constantly change, such as wind direction, wind velocity, flow rate, electrical current or the like, recording measurements at places where temperature and humidity environment requirements are stringent, measurements of which are performed by a water gauge and a weather observation recording apparatus, recording the reading of a tap-water, gas or electricity meter, in which recording by printing is performed by means of a thermal color development system or the like, or recording fare adjustments performed inside trains.

2. Description of the Related Art

When recording is performed on a recording sheet for charts in a high humidity environment, a chart paper absorbs moisture and becomes irregular. Therefore, accurate recording cannot be performed. For this reason, plastic films, synthetic paper, or recording sheets having a coating applied on plastic films or synthetic paper are used when recording is performed in a high humidity environment. However, conventional plastic films, synthetic paper, or recording sheets having a coating applied thereon cannot be folded easily after recording is performed with a pen.

Common chart recording is performed by using a water-based pen. However, the aforesaid plastic films, synthetic paper, or recording sheets having a coating applied thereon do not efficiently absorb ink of a water-based pen. Therefore, when high-density recording is performed, water-based ink on the recording sheet cannot be absorbed and spread sideways, causing the recording to blur. In addition to this, the ink is transferred when the recording sheet is taken up or folded after recording with the water-based pen because the water-based ink is not sufficiently dried, and undried ink contacts a recording sheet fed on the ink.

To cope with this, an oil-based pen which uses an oil-based ink which dries quickly instead of a water-based pen has been used. However, the pen point of an oil pen dries easily. Thus, pen points have to be replaced frequently, and considerable labor is required. In addition, chart recording is performed on a recording sheet in a high temperature environment, irregularities are caused in a recording sheet formed of paper, and thus recording with a high degree of accuracy cannot be performed.

For this reason, plastic films, synthetic paper, or recording sheets having a coating applied thereon are used. However, they do not efficiently absorb the ink of a water-based pen, therefore an oil-based pen must be used. However, when an oil-based pen is used, solvents of oil-based ink evaporate easily in high temperatures, and thus pens have to be replaced frequently, making high-density recording impossible.

The above-mentioned plastic films, synthetic paper, or recording sheets having a coating performed thereon have unsatisfactory resistance to heat. Thus, when there are temperature changes during recording or analysis, thermal shrinkage is caused, making precise recording or analysis impossible. In addition to this, such films, paper, or sheets, have poor resistance to water, and thus if they are exposed to water, ink flows and it is difficult to read the record. In addition, for instance, winding curl is caused in a roll sheet type.

Common paper of high-grade paper wound in the form of a roll or the like is used during recording of the reading of a meter by the use of a printer or during fare adjustment.

However, since paper is wound in the form of a roll, the paper tends to curl. Also, if the paper is cut from the printer after printing, the paper curls. Thus, the work of a meterman is hindered, and the person receiving the paper must expand the curled paper to read the contents thereof. Also, when the curled paper is laminated on a record list and stored, such storing is hindered in a condition in which the paper is curled. In addition, because the paper is common paper, it has poor resistance to water, and thus the meterman must be careful not expose the paper to rain.

In addition, when the paper is used for fare adjustment inside trains, there is a problem, for example, the paper must be expanded to check it at a ticket gate or the like.

SUMMARY OF THE INVENTION

In view of the above-described prior art, an object of the present invention is to provide a recording sheet which makes high-density and high-accuracy recording possible by making use of a water-based pen even in a high humidity and/or high temperature environment, or in an environment where temperature changes greatly, the recording sheet having high resistance to water and no tendency to curl.

The present invention has been achieved to solve the above-mentioned problems of the prior art.

To this end, according to the present invention, a recording sheet having an ink absorbing layer or a printing layer is provided on at least one side of a substrate formed from a void containing polyester film.

In the present invention, a void containing polyester film used for a substrate has a specific gravity 0.7–1.2 preferably 0.8–1.0. The film has flexibility higher than that of conventional plastic film, synthetic paper, or recording sheets having a coating applied on plastic film or synthetic paper, and a small amount of thermal shrinkage is caused therein. The film wound in the form of a roll does not curl when the film is cut into sheets and is able to be folded. As a result, the use of the void containing polyester film as a substrate makes high-density and high-accuracy recording possible by making use of a water-based pen in a high humidity and/or high temperature environment, or in an environment where temperature changes greatly. To increase contact between the substrate and the ink absorbing layer, or between the substrate and the printing layer, the substrate may be treated so that it can readily be contacted with such layers.

Binders and pigments are indispensable for use in an ink absorbing layer. Examples of binders are: polyester resin, polyvinyl chloride resin, polyvinyl acetate resin, polyvinyl alcohol, acrylic resin, styrene resin, urethane resin, and rubber-type resin. These may be used singly, may be mixed, or may be formed into a copolymer. When there is a high humidity environment, a hydrophobic resin is preferred. In a case where the substrate contacts the base material, a polyester resin is preferred.

It is required that oil absorbency of pigments be 50 ml/100 g or above. The following pigments are available: finely divided silicate, diatomaceous earth, white carbon, micronized aluminum anhydride, micronized titanium oxide, aluminum silicate, inorganic filler such as clay, urea resin pigments, and organic pigments such as polystyrene or polymethyl methacrylate. Of the above, finely divided silicate is preferred. Furthermore, pigments having high oil absorbency are preferred and, more preferably, pigments having excellent oil absorbency of 100 ml/100 g.

A highly absorbent ink absorbing layer for a water-based pen can be obtained by binders and pigments, making possible chart recording using a water-based pen. If, however, pigments having an oil absorbency smaller than 50 ml/100 g are used, the ink of the water-based pen cannot be absorbed quickly, and it is slow to dry, making chart recording impossible.

In addition to binders and pigments, the following can be added to the ink absorbing layer as required: various types of assisting agents, sizing agents, hydration-resisting agents, fluid improvers, antiseptic agents, deforming agents, and dyes.

The ink absorbing layer is formed in such a way that the pigments and binders described above are applied on a substrate by common coaters, such as blade coaters, air knife coaters, or roll coaters, and then dried. The ink absorbing layer may be provided on both sides of the substrate. When this layer is provided on one side of the substrate, a coat layer may be provided on the rear side of the ink absorbing layer to provide proper smoothness.

When the printer is based on a wire-dot ink-ribbon recording system or a thermal color development system, necessary items for paper for the reading of a meter must be printed prior to recording. Therefore, the printing layer must be suitable for various types of printing, such as off-set, gravure, screen, or letterpress. In addition, necessary characteristics of the printing layer are: high affinity with wax of the ink sheet, or high ink absorbency of the ink ribbon and easy setting thereof.

Preferred examples of binders for forming a printing layer which satisfies these characteristics are: polyester resin, vinyl chloride resin, vinyl acetate resin, vinyl chloride-vinyl acetate copolymer resin, acrylic resin, and styrene resin.

Preferred fillers include: inorganic fillers, such as silica, calcium carbonate, magnesium carbonate, diatomaceous earth, talc, or clay; and organic fillers, such as styrene beads, or polymethyl methacrylate beads.

In addition, surfactants, such as wetting agents, sizing agents, deforming agents, or plasticizers, may be added to a combination of the above-mentioned binders and fillers. Also, an electrostatic prevention agent may be added or applied to them.

As for means for forming sheets, binders, fillers, additives mentioned above, or the like are compounded at specific rates and formed into an application solution. This solution is applied to the substrate and dried in such a manner as to have a thickness of 2 to 15 μm when dried, and preferably, 5 to 10 μm, by using well-known means, for example, a roll coater, wire bar coater, gravure coater, knife coater, or comber coater. Thus, the sheet of the present invention can be obtained.

When the printer is based on a thermal color development system, a printing layer containing a thermal color developer may be provided on the substrate in accordance with the forming means.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Figure 1:
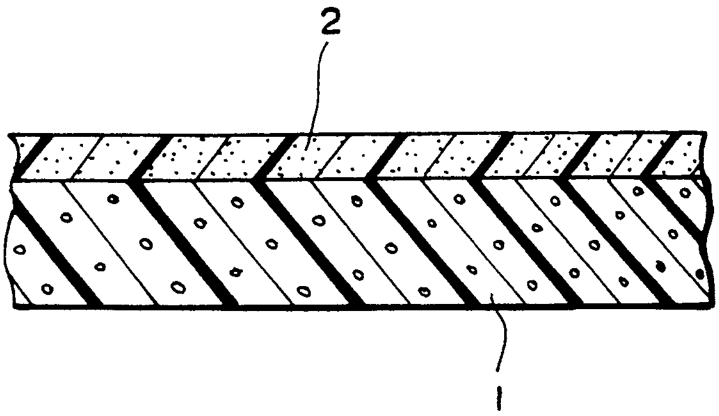
FIG. 1 is a sectional view illustrating the structure of a recording sheet for use in chart recording according to an example of the present invention.
Figure 2:
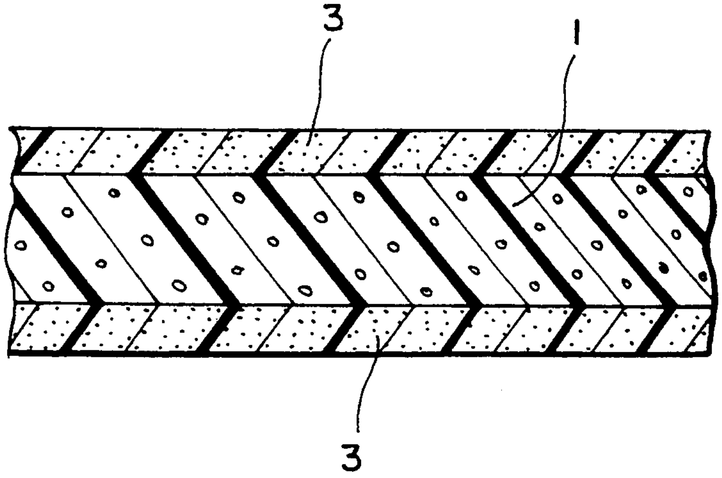
FIG. 2 is a sectional view illustrating the structure of a recording sheet for use with a printer according to another example of the present invention.

Next, embodiments of the present invention will be explained in detail.

In the figures, reference numeral 1 denotes a substrate; reference numeral 2 denotes an ink absorbing layer formed on a surface of a substrate 1 after being applied and dried; and reference numeral 3 denotes a printing layer.

EXAMPLE 1

Composition 1 described below was dispersed by a ball mill for 24 hours. This was applied to a void containing polyester film (Lumirror E-64, 50 μm, manufactured by Toray Industries, Inc.) by an air-knife coater and dried so that the application amount after being dried is 5 g/m$^2$. Thereafter, holes were punched, a scale was printed, and it was perforated, thereby forming a recording sheet.

| Composition 1 | |
|---|---|
| Water-based polyester resin<br>Vylonal MD-1200 (manufactured by Toyobo Co., Ltd.) | 75 parts |
| Comminuted silica<br>Mizukasil P-78F (oil absorbency: 220 ml/100 g) (manufactured by Mizusawa Chemical Industry, Ltd. | 15 parts |
| Surface sizing agent<br>Sansizer SA-502-30 (manufactured by Sanyo Chemical Industries, Ltd.) | 0.2 parts |
| Water | 33 parts |

COMPARATIVE EXAMPLE 1

Composition 1 was dispersed by a ball mill for 24 hours in the same way as in Example 1. This was treated so as to easily contact synthetic paper (Yupo FPG-60, manufactured by Oji-Yuka Synthetic Paper Co., Ltd.) by an air-knife coater and dried so that the application amount after being dried is 5 g/m$^2$. Thereafter, holes are punched, a scale was printed, and it was perforated, thereby forming a recording sheet.

COMPARATIVE EXAMPLE 2

Next, synthetic paper (Yupo VIF-60, manufactured by Oji-Yuka Synthetic Paper Co., Ltd.) was punched, a scale was printed, and it was perforated, thereby forming a recording sheet.

Chart recording was performed on the recording sheet obtained in Example 1, comparative example 1, and comparative example 2 by a water-based pen at a velocity of 25 mm/min in environments of 70° C. and 60% RH. The recording sheet of Example 1 absorbed the water-based ink fast. After recording, the water-based ink dried immediately, it was not transferred onto the recording sheet fed on the recorded water-based ink, and the record was clear. Shrinkage due to heat hardly occurred, high-precision recording could be performed, and the recording sheet could be folded after recording without any problems. Furthermore, even if the recording sheet was exposed to water after recording, the ink did not flow and the record remained as it was.

In contrast, the recording sheet of comparative example 1 was clear as it absorbed the water-based ink quickly. But, shrinkage due to heat occurred, and the scale was distorted. Thus, accurate recording could not be performed. Even if the temperature was dropped to 50° C., approximately 4% shrinkage occurred. After recording, the recording sheet could not be folded naturally.

Since the recording sheet of comparative example 2 could not sufficiently absorb the water-based ink, the water-based ink did not dry completely after recording, and was wound and taken out. The water-based ink was transferred to the recording sheet fed on the recorded water-based ink. As a result, the record blurred. The recording sheet shrank because of heat, and the scale was distorted. Therefore, accurate recording could not be performed. After recording, the recording sheet could not be folded naturally. When it was exposed to water after recording, the ink flowed, and the record did not remain.

Next, high-density recording for recording of triangular waveforms having a width of 5 mm using a water-based pen was performed on the recording sheet obtained in Example 1, and comparative example 1 and 2 at a speed of 20 mm/hr in environments of 70° C. and 60% RH. As the water-based ink was absorbed quickly by the recording sheet obtained in Example 1, a record closer to the original was made.

In contrast, since the recording sheet obtained in comparative example 1 absorbed the water-based ink quickly, although the water-based ink soaked into the sheet, shrinkage due to heat occurred, the scale was distorted, thus accurate recording could not be performed.

In contrast, since the recording sheet obtained in comparative example 2 did not efficiently absorb the water-based ink, the water-based ink did not soak into the sheet and spread sideways. Thus, a record closer to the original could not be obtained. In addition, shrinkage due to heat occurred, the scale was distorted, and therefore accurate recording could not be obtained.

EXAMPLE 2

Composition 2 described below was dispersed by a ball mill for 24 hours. This was applied to a void containing polyester film (Lumirror E-65, 50 $\mu$, manufactured by Toray Industries, Inc.) by an air-knife coater and dried so that the application amount after being dried is 5 $g/m^2$. Thereafter, holes were punched, a scale was printed, and it was perforated, thereby forming a recording sheet.

| Composition 2 | |
|---|---|
| Water-based polyester resin | 75 parts |
| Vylonal MD-1200 (manufactured by Toyobo Co., Ltd.) | |
| Comminuted silica | 15 parts |
| Mizukasorb C-1 (oil absorbency: 230 ml/100 g) (manufactured by Mizusawa Chemical Industry, Ltd.) | |
| Water | 33 parts |

COMPARATIVE EXAMPLE 3

Next, composition 3 was dispersed by a ball mill for 24 hours as a comparative example. This was applied to a foamable polyester film by an air-knife coater and dried as in Example 2 so that the application amount after being dried is 5 $g/m^2$. Thereafter, holes were punched, a scale was printed, and it was perforated, thereby forming a recording sheet.

| Composition 3 | |
|---|---|
| Water-based polyester resin | 75 parts |
| Vylonal MD-1200 (manufactured by Toyobo Co., Ltd.) | |
| Light calcium carbonate | 15 parts |
| MP-555 (oil absorbency: 43 ml/100 g) (manufactured by Maruo Calcium Co., Ltd.) | |
| Water | 33 parts |

Chart recording was performed on the recording sheet obtained in Example 2 and comparative example 3 by a water-based pen at a velocity of 25 mm/min in environments of 70° C. and 60% RH. The recording sheet of Example 2 absorbed the water-based ink quickly. After recording, the water-based ink dried immediately, it was not transferred onto the recording sheet fed on the recorded water-based ink, and the record was clear. The recording sheet could be folded without any problems after recording.

Since the recording sheet of comparative example 3 could not sufficiently absorb the water-based ink, the water-based ink did not dry completely after recording and was wound and taken out. The water-based ink was transferred to the recording sheet fed on the recorded water-based ink. As a result, the record blurred and was unclear.

High-density recording for recording of triangular waveforms having a width of 5 mm using a water-based pen was performed on the recording sheet obtained in Example 2 and comparative example 3 at a speed of 20 mm/hr in environments of 70° C. and 60% RH. As the water-based ink was absorbed quickly by the recording sheet obtained in Example 2, a record closer to the original was made.

In contrast, since the recording sheet obtained in comparative example 3 did not efficiently absorb the water-based ink, the water-based ink did not soak into the sheet and spread sideways. Thus, a record closer to the original could not be obtained. Therefore, accurate recording could not be obtained.

EXAMPLE 3

Composition 1 of Example 1 was dispersed by a ball mill. This was applied by an air-knife coater and dried as Example 1 so that the application amount after being dried is 5 $g/m^2$. Thereafter, holes were punched, a scale was printed, and it was perforated, thereby forming a recording sheet.

COMPARATIVE EXAMPLE 4

Next, for a comparative example of a conventional product, a scale was printed on synthetic paper (Yupo VIF-60, manufactured by Oji-Yuka Synthetic Paper Co., Ltd.), and a recording roll sheet was obtained.

Chart recording was performed on the recording sheet obtained in Example 3 and Comparative Example 4 by a water-based pen at a velocity of 2 mm/min in environments of 70° C. and 60% RH. After recording, the recording sheet was taken up in the form of a roll. When the recording roll sheet of Example 3 after recording was cut off and spread, it was flat and no curl was observed. Therefore, the record could be read. In contrast, when the recording roll sheet of Example 4 was cut off and spread, it had winding curl. The record could be read only when the curl was flattened.

EXAMPLE 4

Composition 4 described below was dispersed by a ball mill for 24 hours. This was applied to a void containing polyester film (Lumirror E-65, 50 μ, manufactured by Toray Industries, Inc.) by an air-knife coater and dried so that the application amount after being dried is 5 g/m$^2$. Thereafter, holes were punched, a scale was printed, and it was perforated, thereby forming a recording sheet.

| Composition 4 | |
|---|---|
| Water-based polyester resin | 75 parts |
| Vylonal MD-1200 (manufactured by Toyobo Co., Ltd.) | |
| Diatomaceous earth | 15 parts |
| Radiolight GC (oil absorbency: 70 ml/100 g) (manufactured by Showa Chemical Co., Ltd.) | |
| Surface sizing agent | 0.2 parts |
| Sansizer SA-502-30 (manufactured by Sanyo Chemical Industries, Ltd.) | |
| Water | 33 parts |

When the same test as in Example 1 was carried out on this recording sheet, satisfactory record effect could be obtained in a manner similar to that described above.

EXAMPLE 5

Ten (10) parts by weight (hereinafter referred to as parts) of silica powder (Mizukasil P-526, manufactured by Mizusawa Chemical Industry, Ltd.), 25 parts of water, and 2 parts of sizing agent (SA502-30, manufactured by Sanyo Chemical Industries, Ltd.) were added to 100 parts of saturated copolymer polyester resin Vylonal MD-1200 (manufactured by Toyobo Co., Ltd.) and dispersed by a ball mill for 24 hours. This was used as a coating material.

This was applied by a roll coater on both sides of the substrate 1 formed of a void containing polyester film (Lumirror E-65, 50 μm, manufactured by Toray Industries, Inc.) having a specific weight of 0.8 to 0.9 and dried so that the thickness after being dried became 8 μm. Thus, a recording sheet for a printer, an example of the present invention, was obtained.

Items necessary for a sheet for the reading of a meter were offset-printed on the recording sheet. Then, it was perforated, a slit was made therein, and the recording sheet was taken up in the form of a roll. After the recording sheet was allowed to stand in this condition for three months, it was set within a handy terminal printer of a thermal transfer recording system, printed, and cut one by one. No winding curl was obtained. In addition, even if it was immersed in water, it was neither deformed nor damaged, and the printed characters were not dimmed. The clear condition thereof immediately after recording was maintained.

EXAMPLE 6

Ten parts of styrene beads (SB-8, manufactured by Sekisui Chemical Co., Ltd.), 10 parts of diatomaceous earth (Radiolight F, manufactured by Showa Chemical Co., Ltd.), and 5 parts of electrostatic eliminater (Chemistat 612, manufactured by Sanyo Chemical Industries, Ltd.) were added to 10 parts of vinyl chloride-vinyl acetate copolymer resin (Vinyblan 240, manufactured Nissin Chemical Industry Co., Ltd.) and dispersed by a ball mill for 24 hours. This was used as a coating material.

This was applied by a wire bar coater on one side of the substrate 1 formed of a void containing polyester film (Crisper, 38 μm, manufactured by Toyobo Co., Ltd.) having a specific weight of 1.1 and dried so that the thickness after being dried is 10 μm. Thus, a recording sheet for a printer, another example of the present invention, was obtained.

When the same test as in Example 5 was carried out on this recording sheet, the same effect as in Example 5 could be obtained.

EXAMPLE 7

Twelve (12) parts of silica powder (Mizukasil P-78F) and 30 parts of water were added to 75 parts of saturated copolymer polyester resin (Vylonal MD-1200) and dispersed by a ball mill for 24 hours. This was used as a coating material.

This was applied by a roll coater on both sides of the substrate 1 formed of a void containing polyester film used in Example 5 and dried so that the thickness after being dried is 10 μm. Thus, a recording sheet for a printer, a further example of the present invention, was obtained. Items necessary for a sheet for the reading of a meter were offset-printed on the recording sheet. Then, it was perforated, a slit was made therein, and the recording sheet was taken up in the form of a roll.

After the recording sheet was allowed to stand in this condition for three months, it was set within a handy terminal printer of a thermal transfer recording system, printed, and cut one by one. No winding curl was observed. The printed condition thereof was satisfactory, and even if the recording sheet was rubbed by fingers immediately after printed, the printed characters did not become dimmed. The clear condition thereof immediately after recording was maintained.

The recording sheet of the present invention, in which a proper ink absorbing layer is provided on one side of a void containing polyester film which is a substrate, can be recorded by a water-based pen when chart recording is performed in a high temperature and high humidity environment. Not only high-precision recording can be obtained, but also it has excellent resistance to water and no winding curl is observed in a roll sheet. In addition, when the recording sheet is used for recording using an oil-based pen, it can be recorded in the same manner as that by a water-based pen. Thus, it is preferred as a recording sheet for a chart. In contrast, the recording sheet in which a printing layer suitable for recording by various types of printing systems, wire-dot ink-ribbon recording system, thermal transfer recording system, thermal color development recording system, or the like is provided on one side of the substrate is preferred as paper for use in the reading of tap water, gas, electricity meter or the like, or a recording sheet for fare adjustment inside trains, because even if it is formed into a roll sheet, it is not curled and has resistance to water.

Many different embodiments of the present invention may be constructed without departing from the spirit and scope of the present invention. It should be understood that the present invention is not limited to the specific examples described in this specification. To the contrary, the present invention is intended to cover various modifications and equivalent arrangements included with the spirit and scope of the claims. The following claims are to be accorded the broadest interpretation, so as to encompass all such modifications and equivalent structures and functions.

What is claimed is:

1. A recording sheet having an ink absorbing layer provided on at least one side of a substrate formed of a void-containing polyester film that has a specific gravity greater than 0.7 and less than about 1.2, the ink absorbing layer containing a pigment having an oil absorbency of between about 50 ml/100 g and 230 ml/100 g and a binder consisting essentially of a hydrophobic resin.

2. A recording sheet according to claim 1, wherein the specific gravity of the void-containing polyester film is between about 0.8 and 1.0.

3. A recording sheet according to claim 1, wherein the thickness of said ink absorbing layer ranges from 2 to 15 μm.

4. A recording sheet that records water-based ink and that does not shrink substantially, the sheet comprising:

a substrate comprising a polyester film containing voids, said film having a specific gravity greater than 0.7 and less than about 1.2; and an ink receiving layer for absorbing a water-based ink on one side of said substrate, said receiving layer consisting essentially of, an oil absorbing pigment having an oil absorbency between about 50 ml/100 g and 230 ml/100 g, and a resin binder.

5. The recording sheet of claim 4 further comprising another said ink receiving layer on a second side of said substrate.

6. The recording sheet of claim 4 further comprising a smooth coating layer on a second side of said substrate.

7. The recording sheet of claim 4 wherein said oil absorbing pigment comprises finely divided silicate and said resin binder consists essentially of a hydrophobic polyester resin.

8. The recording sheet of claim 4 wherein said resin binder is selected from the group of resins consisting of polyester resin, polyvinyl chloride resin, polyvinyl acetate resin, polyvinyl alcohol, acrylic resin, styrene resin, urethane resin, and rubber-type resin.

9. The recording sheet of claim 4 wherein said oil absorbing pigment is selected from the group of pigments consisting of finely divided silicate, calcium carbonate, magnesium carbonate, diatomaceous earth, white carbon, micronized aluminum anhydride, micronized titanium oxide, aluminum silicate, clay, talc, urea resin pigment, polystyrene, and polymethyl methacrylate.

10. The recording sheet of claim 4 wherein said ink receiving layer further contains a thermal color developer.

11. The recording sheet of claim 4 wherein said film has a specific gravity between about 0.8 and 1.0.

* * * * *